Figure 1:
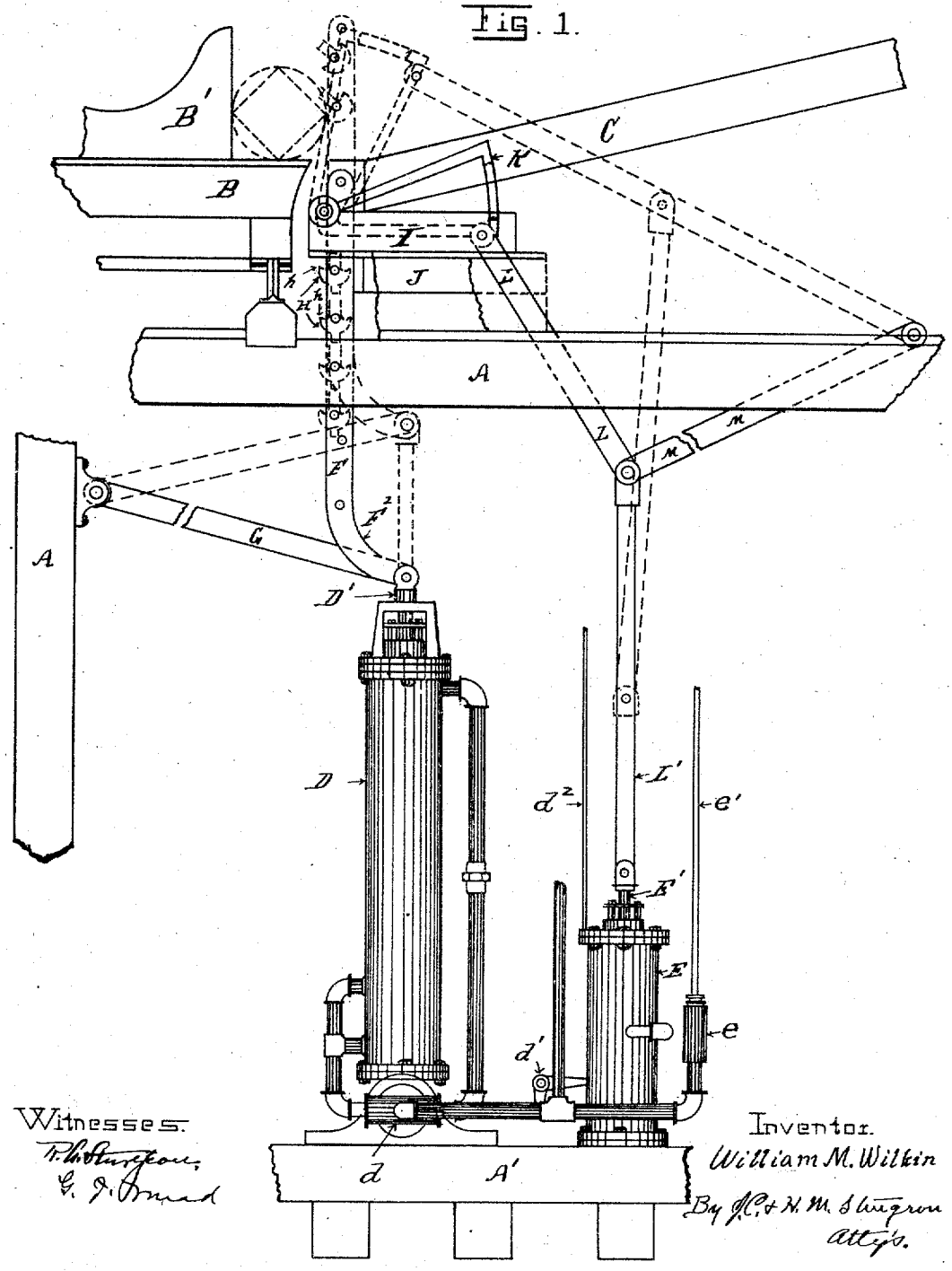

No. 12,353. REISSUED MAY 30, 1905.

W. M. WILKIN.

LOG TURNING MECHANISM.

APPLICATION FILED FEB. 1, 1905.

2 SHEETS—SHEET 1.

Witnesses.
R. Whitington
G. J. Bruce

Inventor.
William M. Wilkin
By H. C. & H. M. Sturgeon
Atty's.

PHOTO-LITHOGRAPHED BY SACKETT & WILHELMS LITHO. & PT'G. CO. NEW YORK.

No. 12,353. REISSUED MAY 30, 1905.
W. M. WILKIN.
LOG TURNING MECHANISM.
APPLICATION FILED FEB. 1, 1905.
2 SHEETS—SHEET 2.
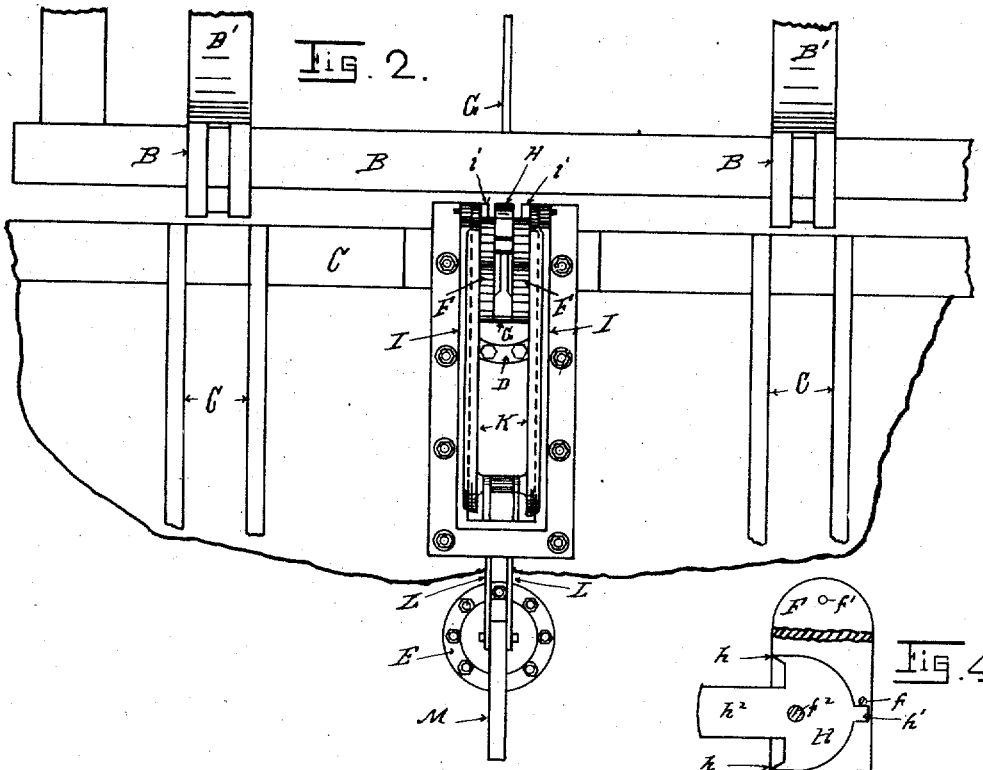
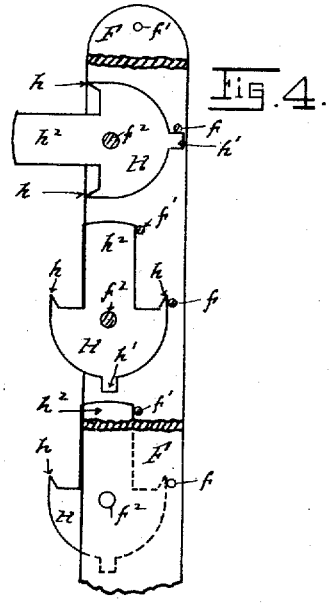
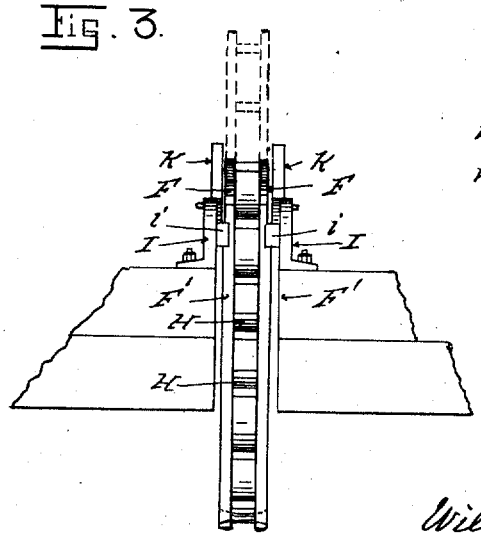
Witnesses.
T. R. Sturgeon,
G. J. Bruce
Inventor.
William M. Wilkin
By S. C. & W. M. Sturgeon
Attys.
PHOTO-LITHOGRAPHED BY SACHETT & WILHELMS LITHO. & PTG. CO. NEW YORK.

No. 12,353. Reissued May 30, 1905.

UNITED STATES PATENT OFFICE.

WILLIAM M. WILKIN, OF ERIE, PENNSYLVANIA.

LOG-TURNING MECHANISM.

SPECIFICATION forming part of Reissued Letters Patent No. 12,353, dated May 30, 1905.

Original No. 721,409, dated February 24, 1903. Application for reissue filed February 1, 1905. Serial No. 243,769.

*To all whom it may concern:*

Be it known that I, WILLIAM M. WILKIN, a citizen of the United States, (formerly a resident of Mobile, in the county of Mobile, in the State of Alabama,) residing at Erie, in the county of Erie, in the State of Pennsylvania, have invented certain new and useful Improvements in Devices in Log-Turning Mechanism; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to improvements in log-turning mechanism for sawmills of the type shown and described in Letters Patent No. 559,426, granted to me May 5, 1896; and it consists, *inter alia*, in providing the mechanism with an auxiliary mechanism consisting, substantially, of a slotted or bifurcated base secured to the mill-frame in front of the saw-carriage, through the front end of which the tooth-bar of the log-turner operates and is laterally supported thereby, and in the front end of which base a bifurcated lever is mounted, which embraces the tooth-bar and which is independently operated for rolling a log from the lower part of the logway upon the saw-carriage and forcing it up against the saw-carriage knees and for holding a partially-turned log against the saw-carriage knees while the tooth-bar is being moved downward to take another hold thereon and for use when desired against the rear edge of the tooth-bar to force it forward when desired.

Another feature of my invention consists in pivoting the cylinder operating the turning-bar at its base and making the turning-bar with an offset therein, pivoting it to the piston-rod of the actuating-cylinder and to a swinging link, so that as the toothed turning-bar moves upward it will automatically move toward the log and press against it with sufficient force to engage the teeth therewith without shoving the log upward against the carriage-knees, and as it moves downward it will tend to move back from the log.

Another feature of my invention is the construction of the toothed bar with reversible teeth removably pivoted therein, so that in case of breakage they can be reversed.

These and other features of my invention are hereinafter set forth and described, and illustrated in the accompanying drawings, in which—

Figure 1 is a side view in elevation of a log-turning mechanism embodying my invention with sections of a saw-carriage and logway. Fig. 2 is a top or plan view of the same. Fig. 3 is a view of a section of the same looking toward the logway. Fig. 4 is a view, partially in elevation and partially in section, of the upper part of the turning-bar.

In the construction of the invention illustrated in the drawings the framework A and A′, the saw-carriage B, the carriage-knees B′, and the logway C are of the usual construction, and the main cylinder D, pivoted to the base-frame A′, its valve mechanism $d$, the auxiliary cylinder E, mounted on said base, and its valve mechanism $e$, with the valve connections $d'$ and $d^2$, connecting the valve $d$ with an operating-lever, (not shown,) and connecting-rod $e'$, connecting the valve $e$ with an operating-lever, (not shown,) are all substantially the same in construction and operation, as are fully shown and described in Letters Patent No. 559,426, granted to me May 5, 1896, and therefore further description thereof herein is deemed unnecessary.

In the main cylinder D there is the usual piston (not shown) with which the piston-rod D′ connects, and to the upper end of the piston-rod D′, I pivot a toothed bar F and also the end of a link G, the other end of which is pivoted to the framework, so that as the piston-rod D′ moves up and down the end thereof moves in the arc of a circle, the radius of which is the link G. The toothed bar F, I make of two flat bars F′ F′, so that the teeth H, hereinafter described, can be pivoted between them, and the lower end of the toothed bar is provided with a curve or offset $F^2$ toward the front of the carriage B, which brings the vertical portion thereof considerably out of line with the side of the piston D and operates to swing the upper end of the toothed bar F toward the carriage B as it is moved upward. The two bars F′ F′, forming the bar F, are secured together, by means of rivets $f$ $f'$ $f^2$, at such distance apart as will admit of the insertion of the teeth H between them, mounted and swinging upon the rivets or studs $f^2$, which are removable. These teeth H, I preferably make semicircular on their lower ends with sharp projections $h$ $h$, forming the terminations of said semicircular portions thereon, and with a central projection $h'$ thereon, adapted to engage the rivet $f$, and with an upward projection $h^2$, adapted to engage the rivet $f'$, which rivets $f$ and $f'$ limit the swing of the teeth H in the tooth-bar F. In this construction the weight of the lower part of the tooth is sufficient to always return it to its normal position, and in case one of the sharp projections $h$ is broken off the tooth can be reversed in the bar. The operation of the tooth-bar and teeth therein upon a log or square cant as the bar moves upward is clearly illustrated by dotted lines in Fig. 1.

As an auxiliary to and coöperating with the mechanism hereinbefore described I secure a bifurcated frame I to a support J upon the framework A directly under the logway C, which frame I embraces the tooth-bar F and is provided at the front end thereof next the carriage B with stops $i$ $i$, against which the front edges of the bars F′ F′ of the tooth-bar F operate to prevent the tooth-bar striking the log-carriage B and operates as a support to the sides of the tooth-bar F, so as to prevent any lateral movement thereof. In the sides of the front end or part of this bifurcated frame I, I pivot the front end of a bifurcated lever K, which lever is adapted to embrace the tooth-bar F, as clearly shown in Fig. 2, and be independently operated by suitable mechanism, as hereinbefore described, to roll a log from the lower part of the logway C upon the saw-carriage B and force it up against the saw-carriage knees B′ and also to hold a partially-turned log against the saw-carriage knees B′ while the tooth-bar F is being moved downward to take another hold thereon, and this lever K can also be used when desired against the rear edges of the tooth-bar F to force it forward against a log. For independently operating the lever K, I provide actuating mechanism, which preferably consists of a link L, pivoted to the lower part of the rear end of the lever K, and the opposite end of the link L is pivoted to the upper end of the link L′, the lower end of which is pivoted to the upper end of the piston-rod E′ of the auxiliary cylinder E, and to the lower end of the link L and the upper end of the link L′, I pivot one end of another link, M, the opposite end of which is pivoted to the mill-framework A, so that when the piston-rod E′ moves upward the links L, L′, and M operate the lever K to raise it, as illustrated in dotted lines in Fig. 1. It is obvious, however, that other mechanism can be utilized for independently operating the lever K, and therefore I do not confine myself to the peculiar mechanism therefor herein described.

From the foregoing description the operation of my invention is so obvious that further description thereof is deemed unnecessary.

Therefore, having described my invention so as to enable others to construct and utilize the same, what I claim as new, and desire to secure by Letters Patent of the United States, is—

1. In a log-turning mechanism the combination of a vertically-moving tooth-bar, a bifurcated lever pivoted at its open end below the plane of the logway so as to embrace the tooth-bar, and suitable mechanism for operating said lever, substantially as set forth.

2. In a log-turning mechanism the combination with a vertically-moving tooth-bar, of a fixed slotted or bifurcated frame through the front end of which the tooth-bar operates, a bifurcated lever pivoted in the front end of said frame so as to embrace the tooth-bar, and suitable mechanism for operating said lever, substantially as set forth.

3. The combination in a log-turning mechanism of a vertical main cylinder mounted upon a supporting-base pivoted to the lower head thereof, a vertical auxiliary cylinder mounted upon a supporting-base, a piston and piston-rod in said main cylinder, a tooth-bar pivoted to and offset vertically from the piston-rod, a link pivoted thereto at one end and to the mill-frame at the other, a frame under the log way through the front end of which the tooth-bar operates, an arm or lever pivoted thereto at its front end at the sides of the tooth-bar passage therein, a link pivoted at one end of the rear end of said arm or lever, and at the other end to a link extending to the piston-rod of the auxiliary cylinder, and also to a link pivoted at one end to the mill-frame, substantially as set forth.

4. In a log-turning mechanism, the combination with a vertically-moving tooth-bar, of a fixed frame through the front end of which the tooth-bar operates, an arm or lever pivoted to the front end of said frame, a link pivoted at one end to the rear portion of said arm or lever, and at the other to a link extending to the piston-rod of the auxiliary cylinder and also to a link pivoted at one end to the mill-frame, substantially as set forth.

5. In a log-turning mechanism, the combination of a vertically-moving tooth-bar, and a vertical cylinder and piston operating the same, a fixed frame the front end of which operates as a guide for the tooth-bar, an arm or lever pivoted to the front end of said frame, an auxiliary piston and piston-rod, and mechanism connecting said piston-rod with said lever, substantially as set forth.

6. The combination in a tooth-bar for log-turners, of a bifurcated frame, reversible teeth H pivoted on removable pivots $f^2$ therein, stops $f$ and $f'$ in said bar, a projection $h^2$ on said tooth adapted to engage the stop $f'$, and a projection $h'$ on said tooth adapted to engage the stop $f$, substantially as set forth.

In testimony whereof I affix my signature in the presence of two witnesses.

WILLIAM M. WILKIN.

Witnesses:
H. M. STURGEON,
P. S. STURGEON.